June 5, 1956  F. KUSS  2,749,200
TRUNNION MOUNTING FOR CHASSIS AND THE LIKE
Filed Aug. 6, 1954  4 Sheets-Sheet 1
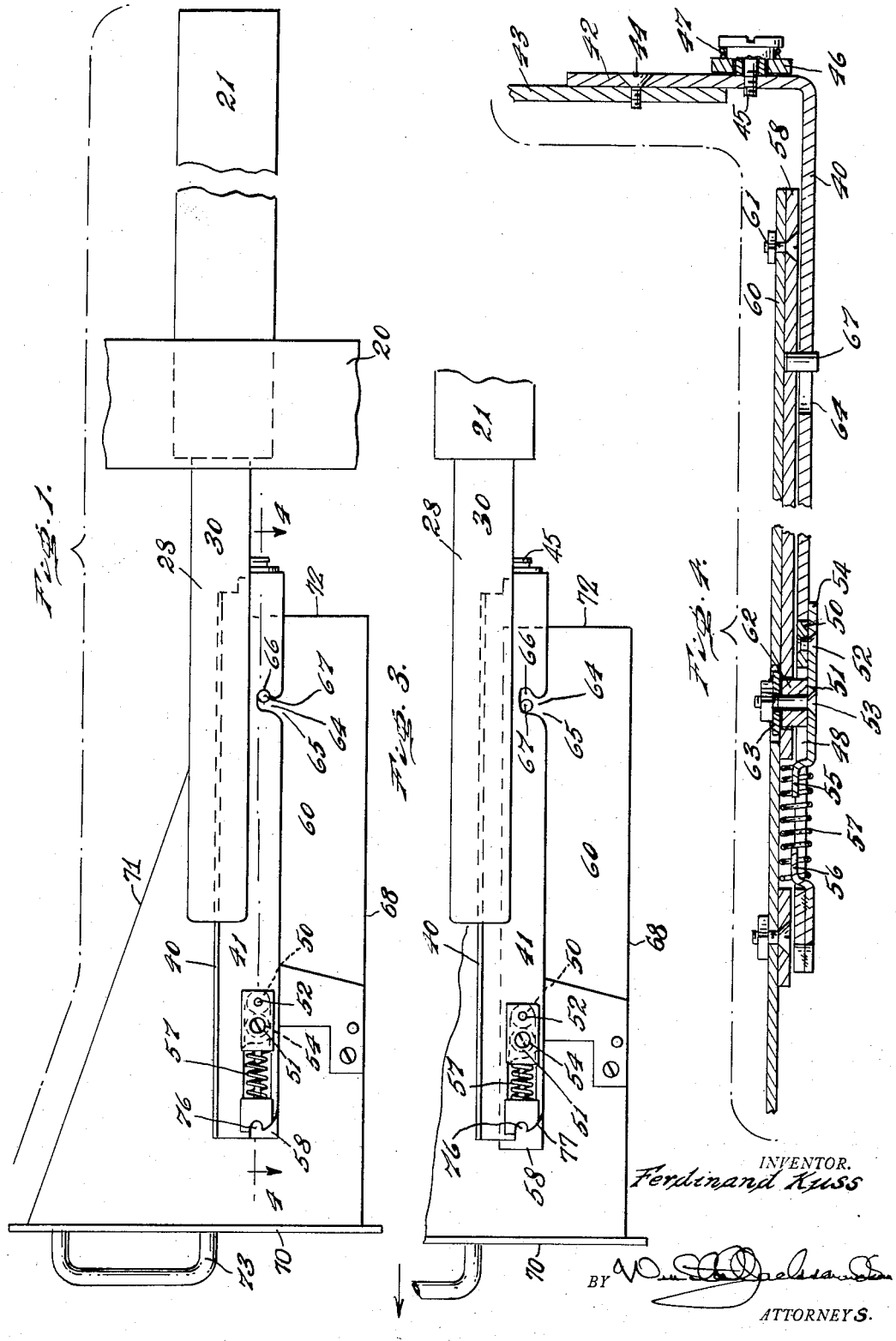
INVENTOR.
Ferdinand Kuss
BY
ATTORNEYS.

June 5, 1956  F. KUSS  2,749,200
TRUNNION MOUNTING FOR CHASSIS AND THE LIKE
Filed Aug. 6, 1954  4 Sheets-Sheet 2
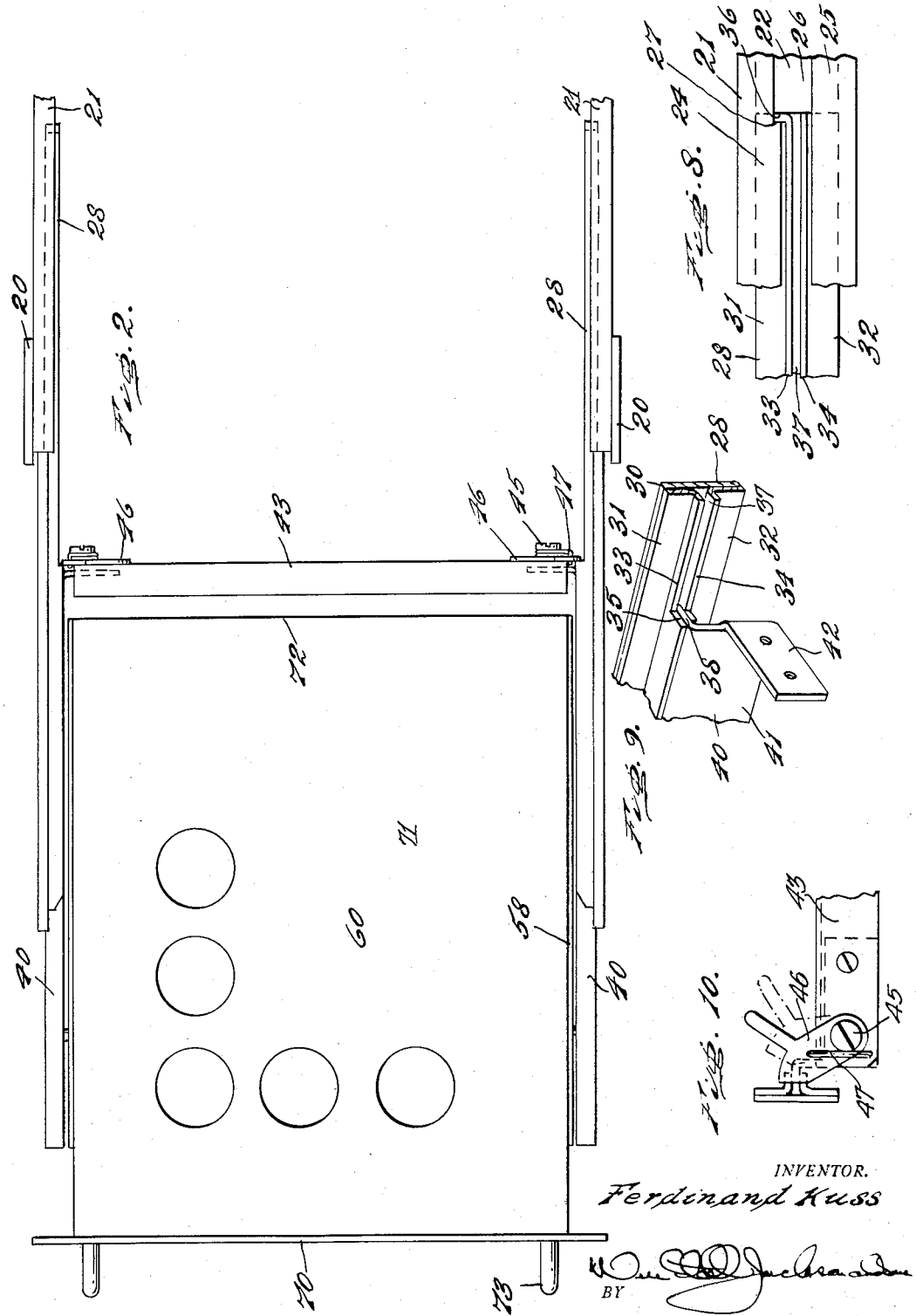
INVENTOR.
Ferdinand Kuss
BY
ATTORNEYS

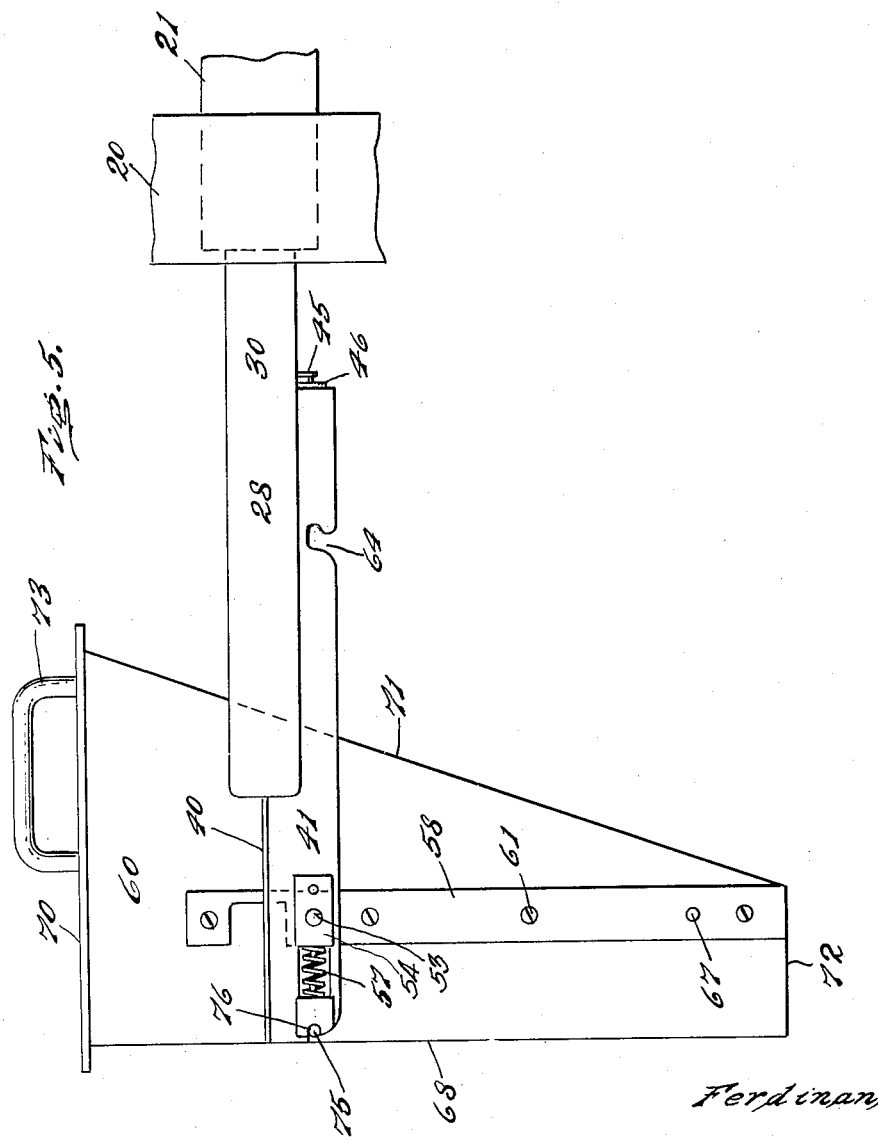

June 5, 1956 F. KUSS 2,749,200
TRUNNION MOUNTING FOR CHASSIS AND THE LIKE
Filed Aug. 6, 1954 4 Sheets-Sheet 4
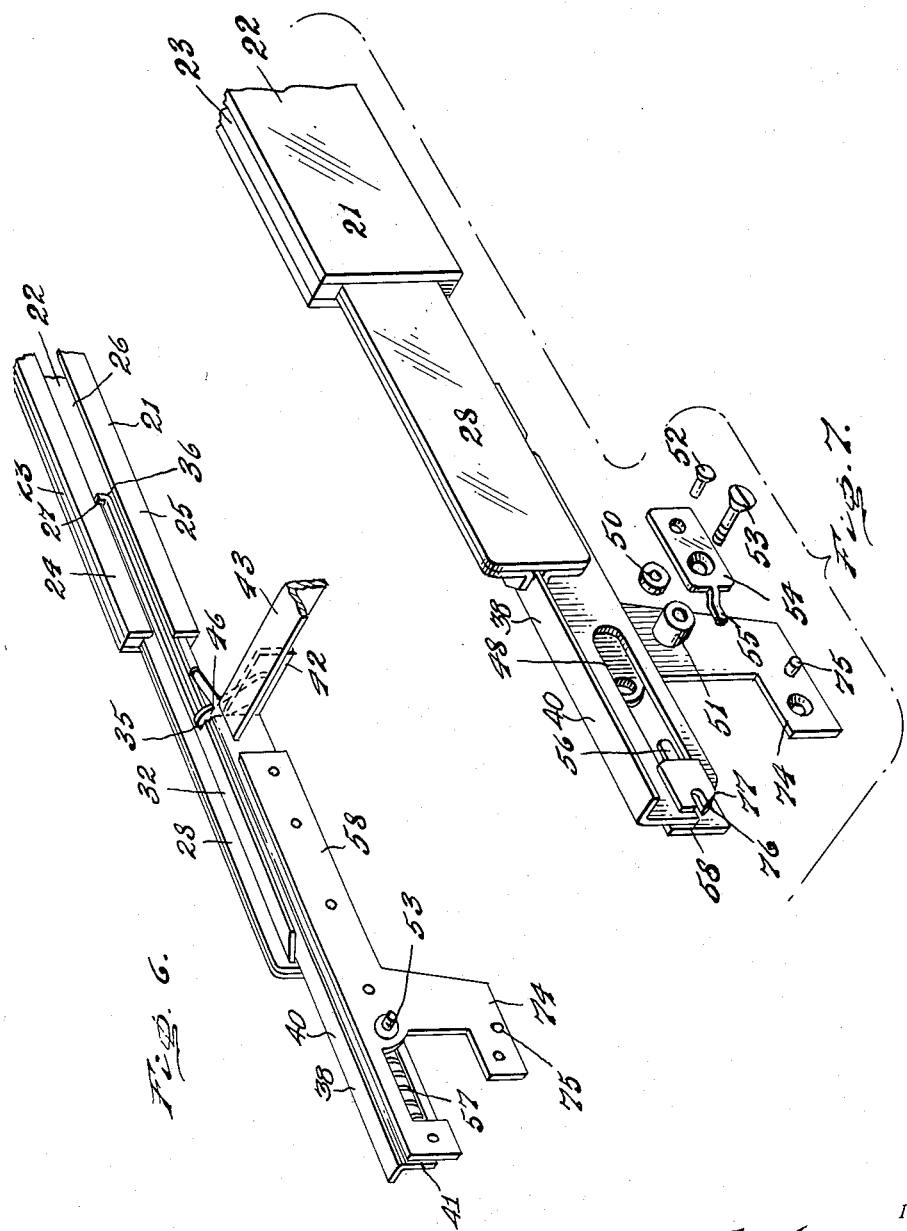
INVENTOR.
Ferdinand Kuss
BY
ATTORNEYS.

United States Patent Office 2,749,200
Patented June 5, 1956

2,749,200

TRUNNION MOUNTING FOR CHASSIS AND THE LIKE

Ferdinand Kuss, Philadelphia, Pa.

Application August 6, 1954, Serial No. 448,312

2 Claims. (Cl. 312—323)

The present invention relates to mountings for assembly, testing, repair and the like of equipment, especially electronic and mechanical equipment.

A purpose of the invention is to provide a trunnion mounting for chassis and the like which firmly supports the chassis in horizontal retractable position, but permits ready shifting and clamping of the chassis in vertical position to permit access to the bottom.

A further purpose is to mount the chassis between mounting plates, to pivot the mounting plates on slides, and to latch the slides to the mounting plates both in horizontal and vertical position of the chassis, preferably using the same spring bias for both latchings.

A further purpose is to provide longitudinal slots in the slides, to position guide means, preferably rollers, in the slots, to connect the guide means to pivot mountings, to spring bias the pivoted mountings rearwardly, to pivot the slides to the mounting plates by pivotal connection between the pivot mountings and the mounting plates, and to provide pin and slot latching engagements between the slides and the mounting plates in both horizontal and vertical position of the chassis.

A further purpose is to provide T-slot rails in general line with the slides on each side, the rails having a narrow opening portion near the front and a wide opening portion toward the rear with a shoulder between, a rear slide slidable in each T-slot rail, a first stop at the rear of each rear slide engaging the shoulder in forward position, each rear slide having a track in which the slide mentioned above is slidable, there being a flange along the side of each rear slide toward the front ending in a rearwardly directed shoulder, and latch means movable with the mounting plates and in forward position engaging the shoulders on the rear slides.

Further purposes appear in the specification and in the claims.

In the drawings I have chosen to illustrate one only of the numerous embodiments in which my invention may appear, selecting the form shown from the standpoints of convenience of illustration, satisfactory operation, and clear demonstration of the principles involved.

Figure 1 is a fragmentary side elevation of the mounting of the invention.

Figure 2 is a fragmentary top plan view of the device of Figure 1.

Figure 3 is a fragmentary view corresponding to Figure 1, showing the horizontal latch released.

Figure 4 is a fragmentary enlarged section on the lines 4—4 of Figure 1.

Figure 5 is a fragmentary side elevation showing the chasis in vertical position.

Figure 6 is a fragmentary perspective of one slide and one mounting plate at one side of the mechanism, showing also one rear slide and part of one rail.

Figure 7 is an exploded fragmetary enlarged perspective showing one slide, pivot mounting, guides, and pivot.

Figure 8 is a fragmentary enlarged interior elevation of one of the rails and the rear slide in outer-limiting position.

Figure 9 is a fragmentary perspective which shows the rear slide and the slide (forward) in limiting forward position with the rear latch removed.

Figure 10 is a detail rear elevation illustrating the rear latch on one side of the mechanism.

Describing in illustration but not in limitation and referring to the drawings:

In the manufacturer of electronic equipment such as radios, industrial amplifiers, televisions, and the like, as well as in the manufacture of mechanical and hydraulic mechanism and instruments, and also in the testing and repair of such equipment, it is very desirable to be able to gain access at will to either the top or the bottom of the equipment, or be able to view the bottom and reach around to the top without interruption.

For the purpose of convenience in designating the piece of equipment, but without intention to limit to electronic equipment, the equipment which is being installed, repaired, tested, or otherwise is under manipulation is referred to herein as a chassis to indicate any suitable frame, box, housing, or other form of enclosure for the apparatus.

The present invention represents an improvement over prior art mountings for chassis because of the greater simplicity of the mechanism, and the greater convenience in manipulating the chassis to provide extended horizontal support, with ability to reach in, under or over or around the chassis, and also to provide for instantaneous tilting of the chassis into vertical position with the bottom outermost for operations such as wiring and the like.

In accordance with the invention, trunnion pivot support is provided on slides, and latching mechanism permits latching of mounting plates either longitudinally with respect to the trunnion supporting slides or vertially with respect to the slides, while at the same time the forward slides are permitted to move forward and backward with respect to a rear slide and a track.

A very advantageous feature of the invention is that pivot mountings are provided guided in slots on the slides, and spring biased rearwardly, and the pivotal connections to the slides are made through the pivot mountings, so that relative motion can be accomplished against the action of the corresponding biasing spring between each mounting plate and the slide so as to accomplish unlatching either in the horizontal or in the vertical position of the chassis.

A further desirable feature of the invention is that the T-slot rails provide shoulders which are engaged by stops on the rear slide to limit forward motion of the rear slide and the rear slides provide shoulders which are engaged by latches on the slides (forward), so as to limit forward motion of the slides, although the latches can be released as desired to permit removal of the slides with the chassis.

Considering now the drawings in detail, uprights 20, at each side of the rail and slide positions, mount rails 21 which extend generally horizontally, and are desirably of T-slot cross section, having a back rail portion 22, top and bottom spacers 23, and top and bottom flanges 24 and 25 which fail to meet, leaving an interior side slot 26.

The top flanges of the rails are narrow at the rear and wider at the front forming stop shoulders 27 where the wide part of the slot 26 ceases and the narrow part of the slot 26 begins as best seen in Figure 8.

Fitting in the T-slots of each rail and guided thereby is a rear slide 28 which suitably consists of back portion 30, top angle 31 and bottom angle 32 which are joined together as by welding. The angles 31 and 32 have spaced parallel track flanges 33 and 34 which extend inwardly or toward the opposite rail relatively far at the front and less far at the back, forming stop shoulders 35 at intermediate points along the length of the rear slides.

The rear slides at the very back have along the top, lugs 36 which are best seen in Figures 6 and 8 and which in relative forward position of the rear slides engage against the stop shoulders 27 of the rails.

Front slides or as here more usually described, slides, are guided between the flanges 33 and 34 of the rear slides by slot 37 into which projects a flange 38 of a slide 40 which is of angle formation and has a downwardly extending flange 41, and a rearward inwardly extending bracket end 42. The two slides are connected so that they will move together by a cross brace 43 secured to the bracket portions 42 by screws 44.

The bracket portions also carry, near the rear slides, pivots 45 on which are pivotally mounted latches 46 which are urged toward latching position by torsion springs 47 having one end engaging in a hole in the latch and one end engaging in a hole in the slide, and which in normal latching position engage against the stop shoulders 35 on the rear slides. To pull the slides (forward) to the front in order to remove the chassis it is merely necessary to deflect the latches out of the path of the stops 35, and then the slides can be pulled forward out of the rear slides.

As best seen in Figures 1, 3, 4, and 7, each of the slides has an elongated longitudinal slot 48 which receives and guides rollers 50 and 51 pivotally mounted respectively by a rivet 52 and a bolt 53 from a pivot mounting 54, which is suitably a plate larger than the slot 48, and slidable on the outside face of the slide.

The pivot mounting 54 is provided at the forward end with a spring abutment prong 55 which cooperates with an opposing spring abutment prong 56 secured to the slide at the opposite end of the slot 48, to hold a spiral compression spring 57 which urges the pivot mounting rearwardly.

Inside each slide and in one position extending longitudinally along it, is positioned a mounting plate 58 which is secured to the adjoining side of the chassis 60 by bolts 61.

The mounting plate has an opening 62 in line with roller 51 to permit the roller to pass, the roller thus serving as a pivot between the mounting plate and the slide as well as a guide for the pivot mounting. A washer 63 on the inside of the roller extends over the mounting plate and secures the pivot and is held by the bolt and its cooperating nut. There is suitably an opening in the chassis to prevent interference.

From the bottom edge near the rearward end of each slide there is a latching recess 64 which has a bottom access portion 65 with cam entry mouth, and a rearward latching recess 66 which receives a latching pin 67 on the corresponding mounting plate which is urged into latching position by the action of the spring 57 in pushing the mounting plate pivot and the latching projection relatively rearwardly. To unlatch this latch it is merely necessary to pull the chassis and the mounting plates forward against the action of the springs 57, and then the chassis is free to turn about the roller 51 on each side acting as a trunnion bearing to bring the chassis bottom portion 68 into the forward upright position, while the chassis front 70 is at the top, its top 71 is at the rear and its rear 72 is at the bottom as shown in Figure 5.

Handles 73 on the front of the chasses are conveniently used to manipulate the structure.

The mounting plates have offset arms 74 which carry latching pins 75 at positions which, when the chassis is horizontal, are normally below and preferably slightly forward of the trunnion pivot.

The forward end of each slide (forward) has a latching recess 76 with a suitable approach cam face 77 and when the chassis is vertical each latching pin 75 is urged by the cam surface and dropped into the latching recess 76 to latch the chassis in vertical position, again under the action of the springs 57 which urge the chassis pivots rearwardly and thus urge the latching pins in the direction to hold them in the latching recesses.

In operation of the device as just described, the chassis is provided with mounting plates and slides on each side. With the mounting plates and slides extending together longitudinally, the chassis is mounted on the rear slides by inserting the forward slides into the slots of the rear slides, the rear latches 46 being out of the way and pushing the forward slides rearwardly until the latches are beyond the latching shoulders 35. The latches then are free to engage and the chassis can be moved rearwardly into a retracted position or forwardly into operating position as desired, the respective slides moving forwardly and rearwardly as required.

When the chassis is forward, and it is desired to examine or operate on the bottom of the chassis, it is merely necessary to pull the chassis forward so that the latching pins 67 move from the position of Figure 1 to the position of Figure 3. The chassis can then be rotated clockwise in the position of Figure 3 to reach the position of Figure 5, at which position the latching pins 75 engage in the latching recesses 76 and hold the chassis vertical as long as desired. The chassis can even be retracated in the vertical position if desired.

When it is desired to restore the chassis to horizontal position, it is merely necessary to pull the chassis forward so as to release the latching pins 75 and then rotate it counterclockwise in Figure 5, the latching pins desirably automatically snapping into latching engagement in the opening 64 due to the cam action of the outer surfaces of the latching openings.

When it is desired to remove the chassis from the rear slides and rails, this is accomplished by simply deflecting the rear latches and pulling out the chassis forward so that the slides leave the rear slides.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a mounting for a chassis or the like, a pair of spaced parallel slides, mounting plates on the adjoining sides of the slides, there being a longitudinal slot in each slide, guide means in the slots, a pivot mounting connected to the guide means in each slot, pivot means interconnecting each pivot mounting and the adjoining mounting plate, spring means biasing each pivot mounting rearward with respect to the slide, first latch means consisting of a slot extending from one edge of each slide and a cooperating pin in each mounting plate, biased by the spring means, latching the slides and the mounting plates together in longitudinal position and second latch means consisting of a slot at the forward end of each slide, there being a cross arm on each mounting plate, and a cooperating pin in each cross arm, biased by the spring means, latching the slides and the mounting plates together in transverse position.

2. A mounting according to claim 1, in combination with T-slot rails in general line with the slides at each side, the rails having a narrow opening portion near the front and a wide opening portion toward the rear with a shoulder between, a rear slide slidable in each T-slot rail, a first stop at the rear of each rear slide engaging the shoulder in forward position, each rear slide having a track in which the aforesaid slide is slidable, there being a flange along the side of each rear slide toward the front ending in a rearwardly directed shoulder, and latch means movable with the mounting plates and in forward position engaging the shoulders on the rear slides.

References Cited in the file of this patent
UNITED STATES PATENTS 2,655,422    Gussack ---------------- Oct. 13, 1953